Figure 1:
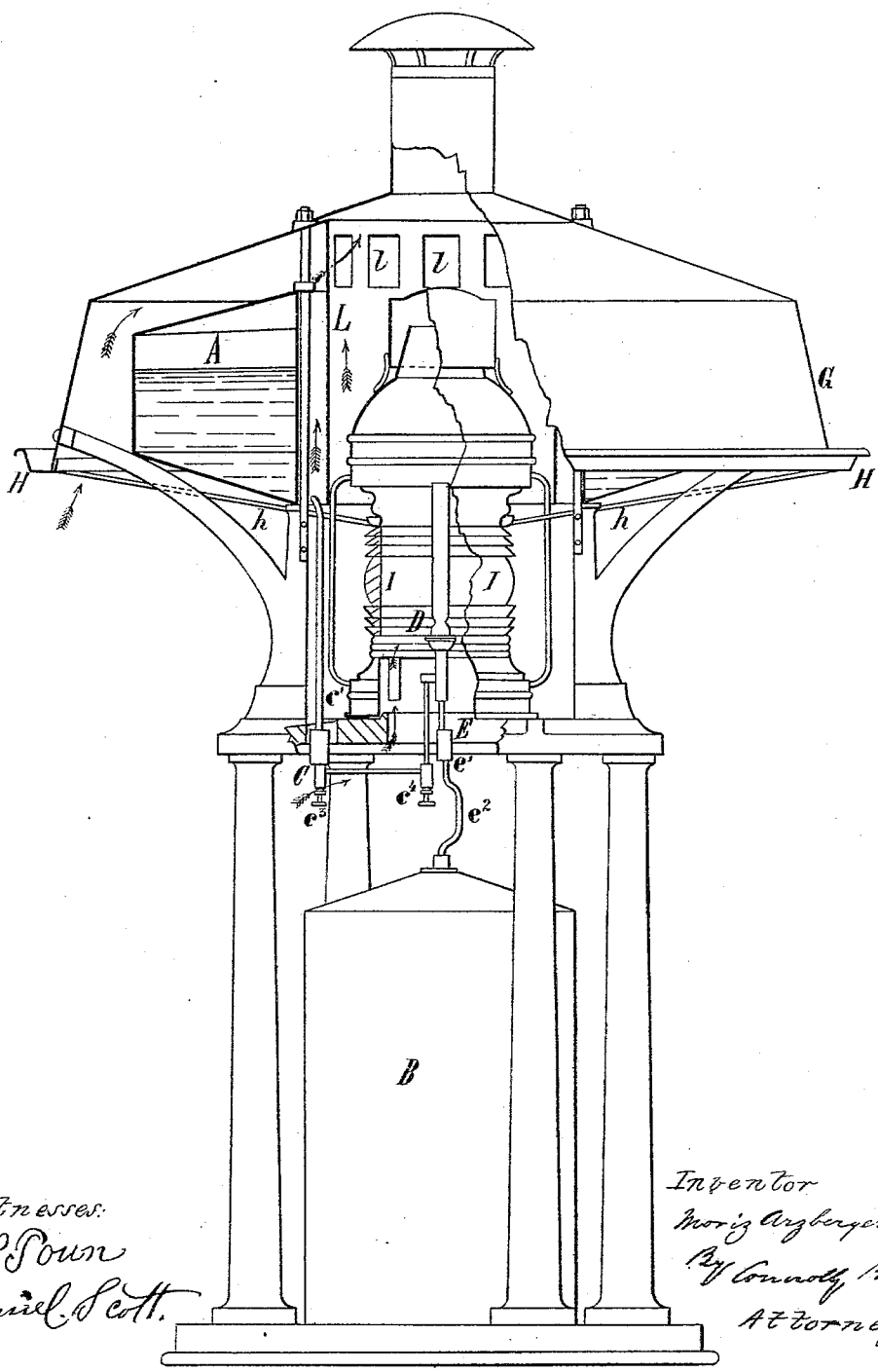

(No Model.) 2 Sheets—Sheet 1.

M. ARZBERGER.
LAMP FOR LIGHT HOUSES.

No. 318,849. Patented May 26, 1885.

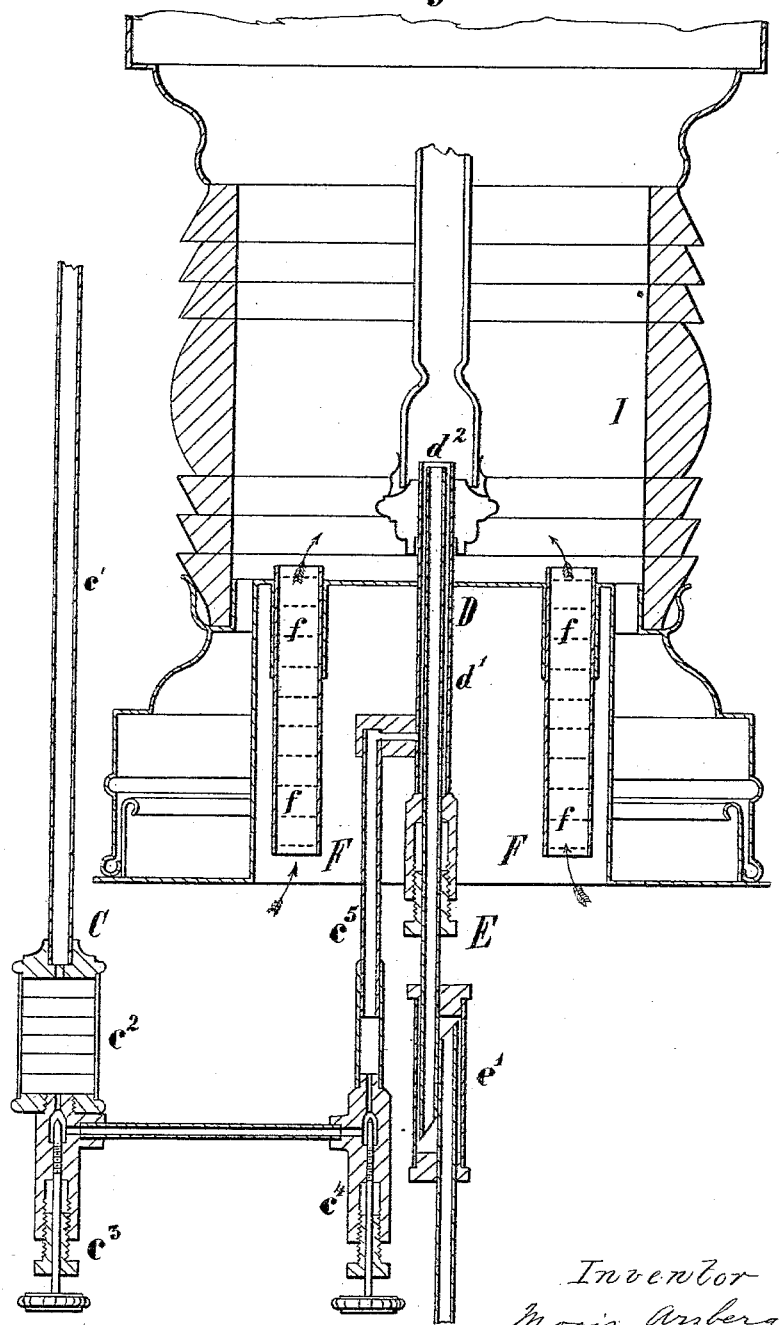

UNITED STATES PATENT OFFICE.

MORIZ ARZBERGER, OF VIENNA, AUSTRIA.

LAMP FOR LIGHT-HOUSES.

SPECIFICATION forming part of Letters Patent No. 318,849, dated May 26, 1885.

Application filed December 11, 1884. (No model.) Patented in Belgium November 19, 1884, No. 66,931; in England November 21, 1884, No. 15,359; in Italy December 31, 1884, XXXV, 48, and in Sweden January 10, 1885.

*To all whom it may concern:*

Be it known that I, MORIZ ARZBERGER, a subject of the Emperor of Austria, and a resident of the city of Vienna, in the Empire of Austria, have invented certain new and useful Improvements in Lamps for Light-Houses and Similar Purposes, of which the following is a specification.

The object of the present invention is to provide a lamp which is capable of burning for several weeks, in any weather and at any temperature, without requiring any attendance, and which, therefore, is particularly suitable for such light-houses which are situated on spots difficult of access, or where the permanent residence of an attendant would be impossible or inconvenient, or too expensive. When such a lamp is employed, capable of burning for a period of about six weeks, it will be sufficient to send an attendant about once a month to refill and clean the lamp. According to the present invention I employ a combination of two petroleum-holders of about equal capacity, one of them being arranged above the other in such a manner that the oil can flow from the upper reservoir to the lower one, and on its way pass through a burner. I further provide arrangements for preventing the lamp from being extinguished by wind, and for preventing the upper reservoir getting heated by the sun or by the flame of the lamp. As fuel for this lamp I preferably employ highly-refined light petroleum free of grease.

In the accompanying drawings, Figure 1 is a view, partly in section, of a lamp embodying the present invention, and Fig. 2 is a section of a part of the lamp drawn to a larger scale.

A is the upper and B is the lower oil-reservoir. The reservoir A communicates with the burner D through the passage C. The passage C consists of the tube $c'$, the filter $c^2$, the needle-valves $c^3$ $c^4$, and the tube $c^5$. The filter $c^2$ may consist of several layers of filtering-paper, and serves to prevent the valves from being choked by dust or other impurities. The burner D consists of the outer tube, $d'$, and of the inner tube, $d^2$. The petroleum rises through the outer tube, $d'$, to the mouth of the inner tube, $d^2$, which forms the burner, and that portion of the petroleum which is not burnt here flows down through the inner tube, $d^2$, into the lower holder, B. The overflow passage E is provided with a siphon or air-check, $e'$, to prevent any draft of air from the reservoir B to the burner. At $e^2$ a glass tube is provided, through which the drops of oil descending from the burner may be seen, to enable the supply of oil to the burner to be regulated as required. The admission of air to the burner is effected through the tubes F. I preferably employ at least twelve such tubes, although this number may be increased or diminished, according to circumstances. In these tubes several wire-gauze diaphragms are arranged, which allow the air to pass freely, but which in case of wind or gale prevent a violent draft.

G is a metal cover. It may be provided with the gutter H to collect the rain-water which may be caused to flow upon the lenses I through the pipes $h$, in order to wash off any impurities on them.

In order to protect the upper petroleum-holder, A, from the heat of the lamp, I provide a circular shield, L, with holes $l\ l$. By this means a cooling draft around the holder A is established, as shown by the arrows in the drawings.

When the lamp is to be used, the reservoir A is filled with petroleum. Then the needle-valves $c^3 c^4$ are adjusted to regulate the feed of oil to the burner D, so that not too much of the oil will flow off. The lamp may then be lighted. When the lamp is so arranged that it can burn about six weeks, then after about four or five weeks the upper holder, A, has to be refilled, and the lower holder, B, has to be emptied by means of a tap provided thereon, and the burner to be screwed off for cleaning and to be replaced by a new one.

I claim—

The combination of the upper oil-holder, A, with the passage C, the burner D, the overflow E, and the lower oil-holder, B, for the purpose specified.

In testimony whereof I have affixed my signature in presence of two witnesses.

MORIZ ARZBERGER.

Witnesses:
   C. O. PAGET,
   E. G. F. MOELLER.